S. E. LAWRENCE.
VEHICLE TOWING MECHANISM.
APPLICATION FILED FEB. 11, 1919.

1,307,781.

Patented June 24, 1919.
2 SHEETS—SHEET 1.

Inventor
S. E. Lawrence

By D. Swift & Co.
Attorneys

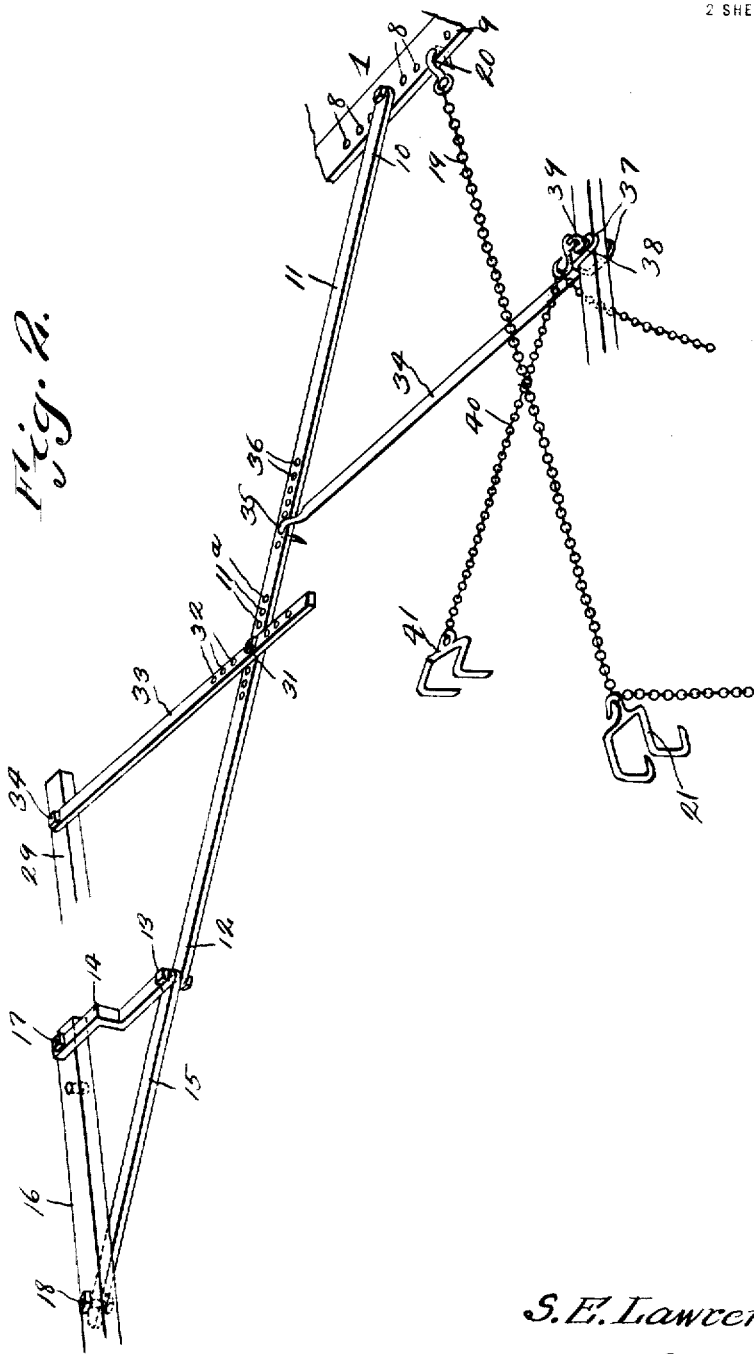

UNITED STATES PATENT OFFICE.

SAMUEL E. LAWRENCE, OF SAYBROOK, ILLINOIS.

VEHICLE-TOWING MECHANISM.

1,307,781.   Specification of Letters Patent.   Patented June 24, 1919.

Application filed February 11, 1919. Serial No. 276,397.

*To all whom it may concern:*

Be it known that I, SAMUEL E. LAWRENCE, a citizen of the United States, residing at Saybrook, in the county of McLean, State of Illinois, have invented a new and useful Vehicle-Towing Mechanism; and I do hereby declare the following to be a full, clear, and exact description of the invention, such as will enable others skilled in the art to which it appertains to make and use the same.

The invention relates to towing mechanisms whereby two vehicles may be towed behind a tractor, said towed vehicles being preferably a corn picker and a wagon, into which wagon, the corn from the corn picker is deposited by means of a conveyer.

A further object is to provide towing means whereby the tractor will tow a corn picker and wagon, maintaining the same in parallel relation as the tractor advances, also to provide means whereby the front wheels of the corn picker and wagon will be moved in unison when the tractor turns or moves out of a straight course.

A further object is to provide a two vehicle towing device, whereby two vehicles may be towed in parallel relation and to provide means whereby the front wheels of the towed vehicles, will be capable of adjustment relative to each other so as to insure the straight running direction of each towed vehicle in parallel relation to each other. Also to provide means whereby the towed vehicles may be towed at different distances from each other.

With the above and other objects in view the invention resides in the combination and arrangement of parts as hereinafter set forth, shown in the drawings and claimed, it being understood that changes in the precise embodiment of the invention may be made within the scope of what is claimed without departing from the spirit of the invention.

In the drawings:

Fig. 2 is a perspective view of the towing mechanism.

Figure 1:
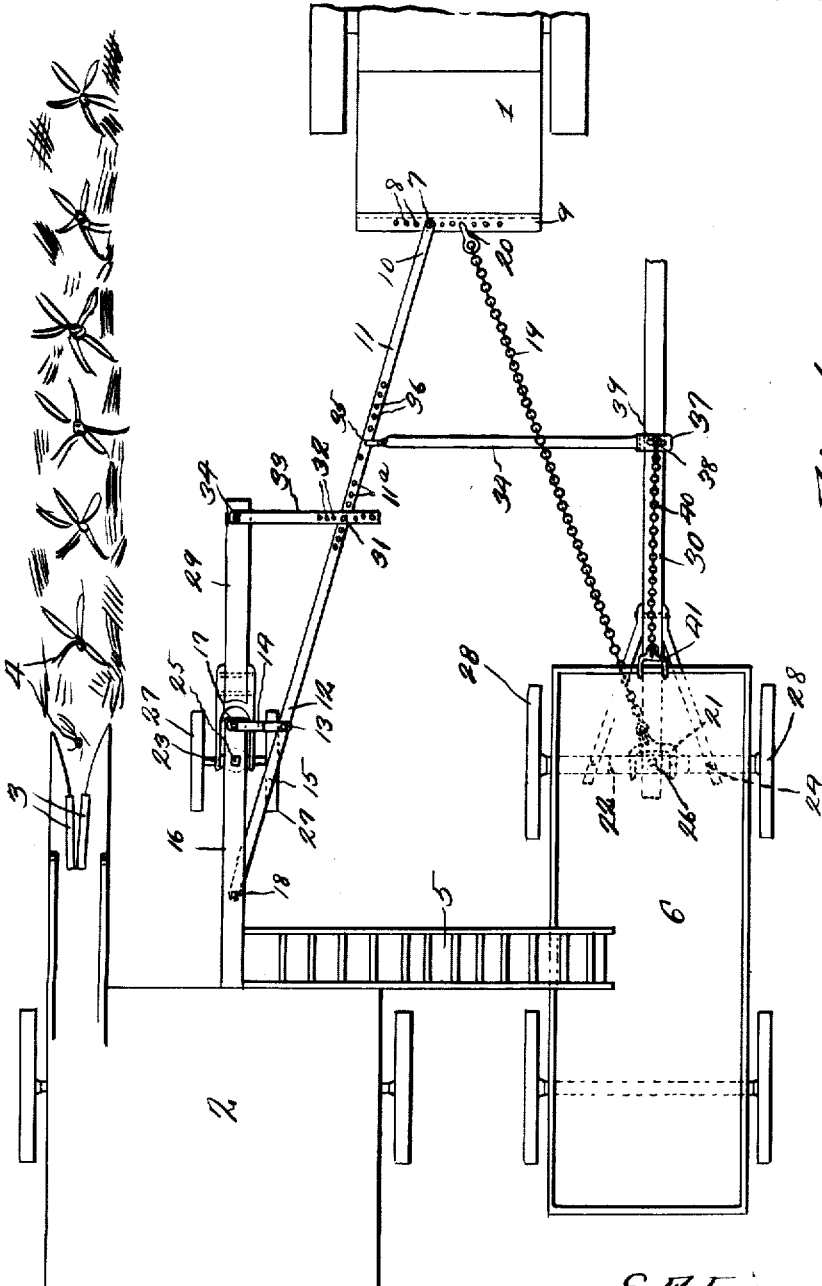
Figure 1 is a plan view of a portion of a tractor, showing the towed vehicles and towing mechanism.

Referring to the drawings the numeral 1 designates a conventional form of farm tractor and 2 a conventional form of corn picker. The corn picker 2 is of that type wherein the corn is pulled by means of rollers 3 which rollers grasp and pull the corn 4. The corn after being picked passes through the picker, being eventually deposited on a conveyer 5, over which it travels, being deposited in the wagon 6 when it leaves the end of the conveyer. It will be seen that it is necessary to keep the wagon 6, as the corn picker advances in parallel relation to the discharge end of the conveyer 5. The present practice is to pull the corn picker by means of a tractor or horses and to pull the wagon by horses. This requires the use of many horses and a number of men, however the vehicle towing mechanism is designed to eliminate the use of horses and reduce the number of men necessary to operate the same to a minimum.

Pivotally secured on a bolt 7, which passes through one of the holes 8 of a clevis 9 on the rear of the tractor 1, is the end 10 of a rearwardly extending bar 11. The bar has its end 12 pivoted upon the bolt 13, which passes through an aperture therein and also through apertures in the bars 14 and 15. The bars 14 and 15 have their other ends secured to the corn picker tongue 16 as shown at 17 and 18, thereby rigidly holding the bars which form a bracket for the pivoting end of the bar 11.

A chain 19 for hitching to the wagon is provided, this chain having a hook 20 at one of its ends adapted to engage any of the apertures 8 of the clevis 9, while its other end is provided with a pair of hooked members 21 which are adapted to engage over the axle 22 of the wagon 6. Both the wagon and corn picker are of the usual construction and are provided with the usual front turning gears 23 and 24, which pivot on king bolts 25 and 26 there being wheels 27 and 28 which turn from side to side as the turning mechanisms are pivoted on the king bolts.

The picker and wagon are placed in parallel relation and at the desired distance from each other, the bar 11, secured to the bolt 13 and the hook 21 of the chain 19 secured to the axle of the wagon, the other ends of the bar 11 and chain 19 are then secured to the clevis 9 on the tractor. While in this position the tongues 29 and 30 of the picker are placed in parallel relation with the direction of movement of the tractor. When in this position a bolt 31 is passed through one of the apertures 32 of a bar 33, which is pivotally secured as at 34 to the tongue 29 of the picker and forms means whereby the tongue 29 is moved to one side or the other as the tractor changes its course. A bar 34 is provided for moving the tongue 30 of the wagon, this bar comprises a hooked end 35 which passes through any of the apertures 36 in the bar 11. Its other end is provided with arms 37, which form a U-shaped member for the reception of the wagon tongue. One of the arms 37 has threaded therein a set screw 38, whereby the tongue may be clamped securely in the U-shaped member. The set screw is provided with an eye 39 and to this eye is secured one end of a chain 40, while the other end of the chain is provided with a hooked member 41 adapted to engage the body of the wagon and support the tongue.

It will be seen that by means of the bar 11 and chain 19, that the towed vehicles will be moved forwardly as the tractor advances, also that during this forward movement that the bars 33 and 34 will maintain the tongues 29 and 30 of the picker and wagon in proper position so that they will keep in parallel relation to each other as the tractor advances. However it will also be seen that if the tractor moves or turns to either side that the bars 33 and 34 will be moved so that the tongues of the picker and wagon, will be turned in the proper direction so that the same will follow the tractor, remaining in their parallel relation.

When it is desired to adjust the tongues to different positions it will only be necessary to move the hooked end of the bar to one of the apertures 36 and remove the bolt 31 and adjust the bar 33, so that the bolt 31 may be passed through any of the apertures 32 and 11ª. A further adjustment of the mechanism may be attained by adjusting the hook 20 of the chain 19 and end 10 of the bar 11 to any of the apertures 8 of the clevis 9, The invention having been set forth what is claimed as new and useful is.

1. A vehicle towing device comprising a bar and a flexible chain or cable having one of their ends adjustably connected to the rear end of a towing vehicle, their other ends connected to two parallel disposed vehicles to be towed in parallel relation to each other, pivoted bars pivotally connected to the tongues of the vehicles and adjustably connected to the first mentioned bar so that the tongues of the vehicles will be turned when the towing vehicle turns to either side.

2. A vehicle towing device comprising a bar and a flexible chain or cable having one of their ends pivotally connected to the rear end of a towing vehicle, their other ends pivotally connected to vehicles in parallel relation to each other, said vehicles being provided with front turning gears having tongues, tongue guiding bars pivotally connected to the tongues at one of their ends and their other ends adjustably connected to the first mentioned bar so that the front turning gear of the towed vehicles may be adjusted relative to each other, said tongue bars forming means whereby the tongues of the vehicles will be turned in the direction of turn of the towing vehicle.

3. A vehicle towing device comprising a bar and a flexible chain having one of their ends adjustably connected to the rear end of a towing vehicle, their other ends pivotally connected to vehicles to be towed in parallel relation to each other, said adjustable connection of the bar and chain to the rear end of the towing vehicle allowing forward and rearward adjusting of the parallel vehicles relative to each other, said vehicles being provided with front turning gears having tongues, tongue guiding bars having one of their ends connected to the tongues of the vehicles and their other ends connected to the first mentioned bar, said first mentioned bar being provided with a series of apertures whereby the inner ends of the tongue bars may be adjusted so that the tongues of the vehicles may be adjusted relative to each other so that the vehicles may be placed nearer together in parallel relation or farther apart in parallel relation and means whereby one of the tongues may be supported.

In testimony whereof I have signed my name to this specification in the presence of two subscribing witnesses.

SAMUEL E. LAWRENCE.

Witnesses:
W. O. BUTLER,
CLYDE PERRY.